137-13. OR 3,601,137 SR

[11] 3,601,137

[72] Inventor Peter Bauer
Germantown, Md.
[21] Appl. No. 743,711
[22] Filed July 10, 1968
[45] Patented Aug. 24, 1971
[73] Assignee Bowles Corporation
Silver Spring, Md.

[54] APPARATUS AND METHOD FOR PROVIDING VARIABLE FUNCTION GENERATION IN FLUIDIC SYSTEMS
30 Claims, 9 Drawing Figs.

[52] U.S. Cl. ........ 137/81.5
[51] Int. Cl. ........ F15c 1/04
[50] Field of Search ........ 137/81.5; 235/200, 201

[56] References Cited

UNITED STATES PATENTS

| | | | |
|---|---|---|---|
| 3,428,067 | 2/1969 | Dexter et al. | 137/81.5 |
| 3,456,665 | 7/1969 | Pavlin | 137/81.5 |
| 3,461,777 | 8/1969 | Spencer | 137/81.5 |
| 3,469,592 | 9/1969 | Kuczkowski et al. | 137/81.5 |
| 3,486,520 | 12/1969 | Hyer et al. | 137/81.5 |
| 3,491,784 | 1/1970 | Lilly | 137/81.5 |
| 3,500,846 | 3/1970 | Wood | 137/81.5 |
| 3,199,782 | 8/1965 | Shinn | 235/201 P |
| 3,250,469 | 5/1966 | Colston | 137/81.5 X |
| 3,273,377 | 9/1966 | Testerman et al. | 137/81.5 X |
| 3,302,398 | 2/1967 | Taplin et al. | 137/81.5 X |
| 3,326,227 | 6/1967 | Mitchell | 137/81.5 |
| 3,326,463 | 6/1967 | Reader | 137/81.5 X |
| 3,342,197 | 9/1967 | Phillips | 235/201 P |
| 3,398,758 | 8/1968 | Linfried | 137/81.5 |
| 3,413,994 | 12/1968 | Sowers III | 137/81.5 |
| 3,420,253 | 1/1969 | Griffin | 137/81.5 |
| 3,430,895 | 3/1969 | Campagnuolo | 137/81.5 X |

*Primary Examiner*—Samuel Scott
*Attorney*—Rose & Edell

ABSTRACT: Techniques are disclosed whereby fluid output signals are provided as selectively variable functions of fluid input signals. One technique employs a fluidic amplifier wherein a fluid output signal varies as a function of the deflection of the amplifier power stream and of the transverse velocity profile of the power stream, the function being rendered variable by providing a fluid stream flowing adjacent to and in a direction opposite to the power stream whereby to selectively modify the power stream velocity profile. Alternatively, a substantially wedge-shaped wall is disposed adjacent the undeflected power stream with the apex of the wedge pointing generally transversely of the direction of the power stream. A command stream of fluid is directed so as to deflect the power stream against the upstream side of the wedge-shaped wall whereby the power stream bounces off the wall at an angle dependent upon the point at which the power stream impacts against the wall. A still further alternative comprises a fluidic circuit in which a variable pressure gain command signal is converted to a correspondingly variable-frequency oscillatory signal which is amplitude modulated by a fluid input signal. The amplitude-modulated signal is then passed through a filter network having a variable amplitude versus frequency characteristic in the range of the oscillatory signal frequency. The amplitude modulation envelope is then recovered by a detector and filter combination to provide an output signal at an amplitude which differs from the input signal amplitude as a function of the gain versus frequency characteristic of the filter. Still other alternatives are disclosed wherein variable pressure input signals are converted to correspondingly variable frequency oscillatory signals, the frequencies of which are varied in accordance with desired gain changes for the input signal and then reconverted to pressure signals at correspondingly varied pressure levels.

INVENTOR
PETER BAUER

BY Hurvitz, Rose & Greene
ATTORNEYS

INVENTOR
PETER BAUER

BY [signature]

ATTORNEYS

APPARATUS AND METHOD FOR PROVIDING VARIABLE FUNCTION GENERATION IN FLUIDIC SYSTEMS

BACKGROUND OF THE INVENTION

The present invention relates to fluidic function generators and more particularly to individual components or circuit having the capability of providing a fluid output signal as a selectively variable function of a fluid input signal.

In copending U.S. Pat. application Ser. No. 676,262 filed Oct. 18, 1967 by R. E. Bowles and entitled "Self-Adaptive Systems," there is described a self-adaptive system in which an amplifier gain characteristic is selectively varied in response to variations in a system parameter. The feature of self-adaptability enables the system to: (1) optimize its own performance when operating under anticipated operating conditions; (2) accommodate changes in operating requirements; and (3) extend system operating conditions to provide performance capabilites of a system not originally anticipated. Generally, a control system can be described mathematically by transfer functions which relate the input and output signals. In a conventional system, this transfer function is a compromise selected by the designer and fixed at the time the system is assembled. This fixed transfer function enables the system to operate adequately within the anticipated range of operating conditions. The conventional system also provides optimized performance for selected points within this range, these points corresponding to the designer's original prediction of the most frequently encountered operating conditions. In an adaptive control system of the type with which this invention is concerned, these transfer functions can be modified on command while the system is operating.

In the present invention, techniques for modifying fluidic amplifier gain characteristics are described. In addition, fluidic circuits having variable output signal versus input signal gain characteristics are provided. The general approach employed herein is to describe techniques by which fluidic elements or fluidic circuits can be provided with selectively variable gain characteristics in response to a variable performance command signal. The performance command signal itself generally represents an evaluation of some parameter or characteristic in a control system and may be generated in any of a number of different ways. Generation of the command signals per se does not constitute part of the present invention. Rather, for present purposes, it will be assumed that a command signal is simply provided in a controllable manner for the purpose of commanding system operations at a particular gain characteristic.

While the primary utilization of the invention disclosed herein is intended for self-adaptive system, it will be apparent to those with ordinary skill in the art that the performance command signals need not necessarily originate as system performance measurement but rather may be provided from system controls actuable independently from the system in which the amplifier element or the circuit is operating.

It is therefore an object of the present invention to provide fluidic elements having output signal versus input signal characteristics which are selectively variable.

It is another object of the present invention to provide a fluidic amplifier having a gain characteristic which is selectively variable.

It is another object of the present invention to provide a circuit in which frequency techniques are employed to selectively vary the fluid output pressure versus fluid input pressure characteristic of the circuit.

It is still another object of the present invention to provide fluidic circuit which provide fluid output signals as selectively variable functions of fluid input signals.

SUMMARY OF THE INVENTION

In one aspect of the present invention a fluid amplifier is provided in which a power stream is deflected in response to an input signal, the output signal being a function of the input signal and of the power stream deflection. The gain of the amplifier may be selectively varied by providing a variable command stream of fluid flowing adjacent the power stream and in a direction opposite thereto. The velocity profile of the power stream is selectively altered as a function of the strength of the command stream whereby to change the output signal produced by a given input signal.

In another aspect of the present invention the gain of a fluidic amplifier is changed by providing an amplifier sidewall having a sharp edge pointing transversely of the power stream and terminating immediately adjacent the power stream in its undeflected position. By selectively bouncing the power stream off the sharp edge and/or the upstream side of the wall, the direction of the power stream is changed for any given input signal level. This "selective bouncing" feature is accomplished by means of a command stream of selectively variable strength, directed generally toward or slightly downstream of the sharp edge of the sidewall from the side of the power stream opposite the sidewall.

In another aspect of the present invention a fluid signal is passed through a passive fluid circuit which is controllable so as to provide a selectively variable output signal versus input signal characteristic. The circuit comprises a pressure controlled oscillator which provides an oscillatory fluid signal having a frequency which varies in response to a gain command signal pressure. The oscillatory signal is amplitude modulated by the input signal and the resultant amplitude-modulated signal has its amplitude modified in a filter having a variable impedance versus frequency characteristic in the frequency range of the oscillatory signal. The signal is then demodulated to recover the amplitude envelope whereby to provide an output signal having an amplitude which varies as a combined function of the amplitude of the input signal and the frequency of the oscillatory signal. Similarly, the input signal amplitude may itself be converted to a corresponding frequency and the command frequency and input frequency applied to a mixer which provides the beat frequency output signal. This beat frequency signal may be applied to a filter having a variable impedance versus frequency characteristic over the frequency range of the beat frequency signal, and the resultant signal may be detected to provide a fluid output signal having an amplitude which depends in part on the gain versus frequency characteristic of the filter.

In still another aspect of the present invention an input signal may be converted to a frequency which is proportional to the input signal level, the frequency being additionally and independently variable by a further command signal. Such, for example, may be the case where the frequency is fed to a divider having a selectively variable division factor. The input frequency may be thus changed as desired and recovered as a variable-amplitude analog signal by utilizing conventional integration techniques.

BRIEF DESCRIPTION OF THE DRAWINGS

The above and still further objects, features and advantages of the present invention will become apparent upon consideration of the following detailed description of several specific embodiments thereof, especially when taken in conjunction with the accompanying drawing, wherein.

DESCRIPTION OF THE PREFERRED EMBODIMENT

Figure 1:
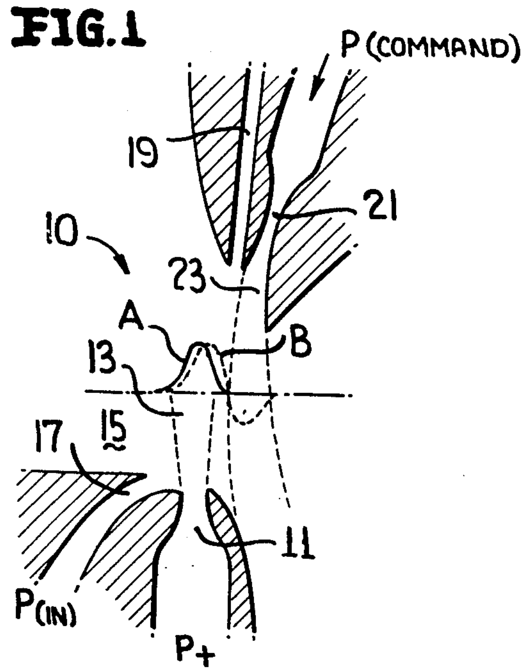
FIG. 1 is a diagrammatic illustration of the operating principles of a first embodiment of the present invention wherein a command stream is directed adjacent to and in a direction opposite to a fluid amplifier power stream.

Referring now specifically to FIG. 1 of the accompanying drawings there is illustrated diagrammatically a proportional type of fluidic amplifier 10 employing the principles of one embodiment of the present invention. Amplifier 10 is of the stream interaction type, designed to operate in the proportional mode. In this type of amplifier a power nozzle 11, upon receipt of pressurized fluid P+, issues a power stream of fluid 13 into an interaction region 15. A control stream, issued from control nozzle 17 for example, impacts against and deflects the power stream away from the control nozzle. There is a conservation of momenta between the power and control streams and therefore the power stream is deflected at the point of impact from its original direction of flow through an angle which is a vectorial function of the momentum of the power stream and the momentum of the control stream. In this manner, a low energy control stream of fluid may be utilized to direct a high energy power stream of fluid toward or away from a target area, such as receiving aperture 19; this phenomenon constitutes amplification. Receiving aperture 19, for purposes of the embodiment diagrammatically illustrated in FIG. 1, is disposed slightly to the right of undeflected power stream 13 whereas control nozzle 17 is disposed on the left side of the power stream 13.

Interaction region 15 is vented at its left and right sides to minimize boundary layer effects and thereby assure analog or proportional operation of amplifier 10. Additional control nozzles and receiver aperture may be provided as desired; however, for purposes of simplifying the present description only one of each is utilized in the embodiment of FIG. 1.

It is known that the power stream of fluid 13, at a predetermined distance downstream of nozzle 11, has a generally bell-shaped velocity pressure gradient transversely of its longitudinal axis. The center of the stream is at a maximum pressure, while the boundary regions of the stream, due to momentum interchange with the the input fluid in interaction region 15, are at a lesser pressure. This bell-shaped pressure characteristic is illustrated by the solid line curve A superposed on power stream 13 in FIG. 1. If the ingress orifice of receiving aperture 19 is disposed at said predetermined distance downstream of power nozzle 11, and if the width of the ingress orifice of receiving aperture 19 is sufficiently small so as to receive relatively small transverse samples of the power stream at any given time, the transverse pressure gradient curve A represents the output pressure signal at receiving aperture 19 as a function of the input pressure differential occurring across power stream 13. Curve A thus represents what may be termed the normal gain characteristic of amplifier 10. It is noted that if the power stream 13 is axially centered on the ingress orifice of receiving aperture 19, maximum pressure is developed in aperture 19. As the power stream is deflected to either side, away from its axially centered position on receiving aperture 19, the output pressure falls off slowly at first and then relatively rapidly at some linear rate until some predetermined deflection of the power stream at which the output pressure versus input pressure begins an asymptotic approach to zero. For the particular embodiment illustrated in FIG. 1, the placement of receiving aperture 19 somewhat off-center relative to the longitudinal axis of power nozzle 11 provides a substantially zero pressure quiescent condition (i.e. zero pressure differential across the power stream) in the amplifier whereby the receiving aperture 19 essentially receives none of the power stream or at best the fringe portions thereof when the power stream is undeflected.

The reason for the bell-shaped configuration of the pressure gradient of power stream 13 may be best illustrated by considering the velocity profile of the power stream which itself is of bell-shaped configuration. The velocity profile of the power stream represents velocity of power stream fluid as a function of distance transversely of the power stream axis. The fluid at the boundaries of the power stream is flowing at a velocity which is slightly greater than that of ambient fluid. The fluid at the center of the stream on the other hand, is flowing at a somewhat greater velocity, representing the maximum velocity of the stream. The slope of the curve between the maximum and minimum velocity is not a straight line but rather more like a bell-shaped curve which rises gradually at first, thereafter rising rapidly in a linear manner toward the center region of the stream at which point the curve levels off at maximum pressure. The curve is symmetrical about the longitudinal axis of the power stream and therefore represents a bell-shaped image. Since, as mentioned above, the relatively narrow ingress orifice of receiving aperture 19 samples a small portion of the power stream, which portion changes as the stream is deflected, this ingress orifice receives fluid at velocities which vary in accordance with stream deflection. Since the received portion of the power stream depends upon the bell-shaped velocity profile of the stream, the output signal pressure must be a function of both the velocity profile curve of the power stream and of the input signal pressure.

In order to provide amplifier 10 of FIG. 1 with a variable gain characteristic, the approach employed herein is to directly vary the velocity profile and hence the pressure gradient of power stream 13 on command. In FIG. 1 this is done by providing a command nozzle 21 disposed at the downstream end of interaction chamber 15 and to the right (as viewed in FIG. 1) of receiving aperture 19. Control nozzle 21 receives a variable pressure command signal to which nozzle 21 responds by issuing a command stream 23 which flows by the side of power stream 13 and in a direction which is substantially opposite to that of power stream 13. The interaction between adjacent boundaries of the command stream 23 and power stream 13 modifies the velocity profile of power stream 13 and therefore changes the gain characteristic amplifier 10. More specifically, for a given command stream velocity, the pressure gradient curve A of FIG. 1 is changed, for example, to curve B illustrated by the dotted lines superposed on the streams 13 and 23 in FIG. 1. It is seen that the command flow 23 renders the new pressure gradient of the power stream asymmetrical with respect to the longitudinal axis of power stream 13, providing a much sharper falloff from maximum pressure to zero pressure on the right side than on the left side of power stream 13. Naturally, as the command stream velocity increases the gain characteristic will have a much sharper falloff and as the velocity of the command stream decreases the curve B will tend to approach the configuration of curve A. The portion of curve B extending through the command stream 23 as illustrated in FIG. 1, of course indicates the velocity profile (and therefore the pressure gradient) of the command stream 23 which it is seen is negative relative to the pressure gradient of the power stream 13 by virtue of the opposite directions of the two streams.

It is important that interaction chamber 15 be adequately vented on both sides of the power stream, not only to eliminate boundary layer effects as discussed above, but also to provide an outlet vent for the command stream 23 so as to prevent pressure buildup within interaction chamber 15 due to the command fluid. Such a pressure buildup would tend to increase the input impedance of amplifier 10 by substantially limiting the freedom of deflection of power stream 13.

Figure 2:
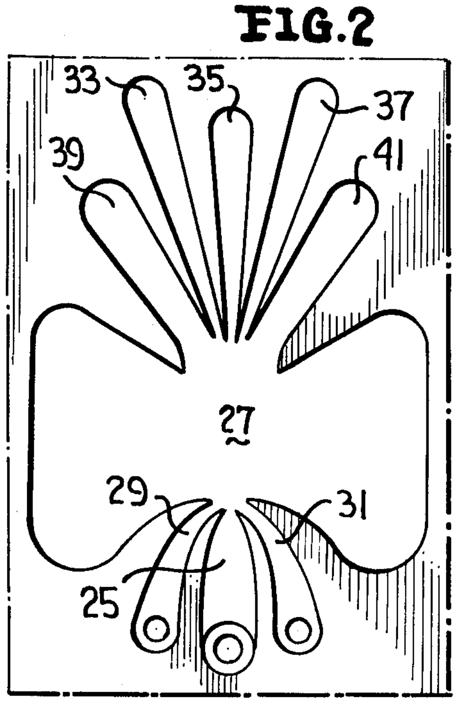
FIG. 2 is a plan view of a fluidic amplifier employing the principles illustrated in FIG. 1.

The principles employed in amplifier 10 of FIG. 1 may, of course, be utilized in a double-sided differential type proportional fluidic amplifier. Such a device is illustrated in FIG. 2 in plan view, the various passages and nozzles being provided by well known and conventional techniques. A power nozzle 25 is provided and adapted to issue a power stream of fluid into an interaction chamber 27 upon application of pressurized fluid to the power nozzle. Left and right control nozzles 29 and 31 respectively are responsive to respective fluid pressure control signals applied thereto to issue respective control streams to impact against the power stream in substantial opposition to one another. At the downstream end of chamber 27 are three output passages, left output passage 33, central output passage 35, and right output passage 37. The particular amplifier illustrated in FIG. 2 is designed symmetrically about the longitudinal axis of power nozzle 25 so that output passage 35 is axially aligned with power nozzle 25 and output passages 33 and 37 are disposed symmetrically with respect to output passage 35. Appropriate flow dividers are provided to separate the respective output passages.

A left command nozzle 39 is disposed adjacent to and to the left (as viewed in FIG. 2) of left output passage 33, and separated therefrom by a flow divider. Left command nozzle 39, like command nozzle 21 of FIG. 1, is adapted to issue a command stream of fluid alongside of and in a direction substantially opposite to the power stream issuing from power nozzle 25. A right command nozzle 41 is disposed adjacent to and to the right of right output passage 37, right command nozzle 41 and left command nozzle 39 being disposed symmetrically with respect to central output passage 35.

The sidewalls of interaction region 27 are set back for the dual purpose of (1) avoiding boundary layer phenomenon which would interfere with the proportional operation of the amplifier; and (2) providing an accessible vent outlet for command stream fluid received from command nozzles 39 and 41.

In operation, the amplifier of FIG. 2 provides fluid pressure output signals at output passages 33, 35 and 37 in response to the differential input pressure across control nozzles 29 and 31 and to the velocity profile configuration of the power stream. The command streams issued from command nozzles 39 and 41 may be derived from a common command signal, whereby the velocity profile of the power stream is changed symmetrically; that is the change in the gain characteristic of the signal appearing at output passage 33 is substantially the same as the change in the gain characteristic of the signal appearing at output passage 37. On the other hand, the command signals applied to command nozzles 39 and 41 may be completely independent, thereby providing for any desired asymmetric gain characteristic. Further, the command signals may be differentially related so that an increasing gain command signal at left command nozzle 39 is accompanied by a decreasing gain command signal at right command nozzle 41 thereby providing a differential variation in the gain characteristic of the amplifier.

As discussed above under "Background of the Invention," the variable pressure command signals received by command nozzles 21 of FIG. 1 and 39 and 41 of FIG. 2 may be provided by means (not illustrated) from which the overall operation of the system in which the amplifier is utilized is monitored. The particulars of such means do not of themselves comprise part of the present invention.

Figures 3, 4, 5A:
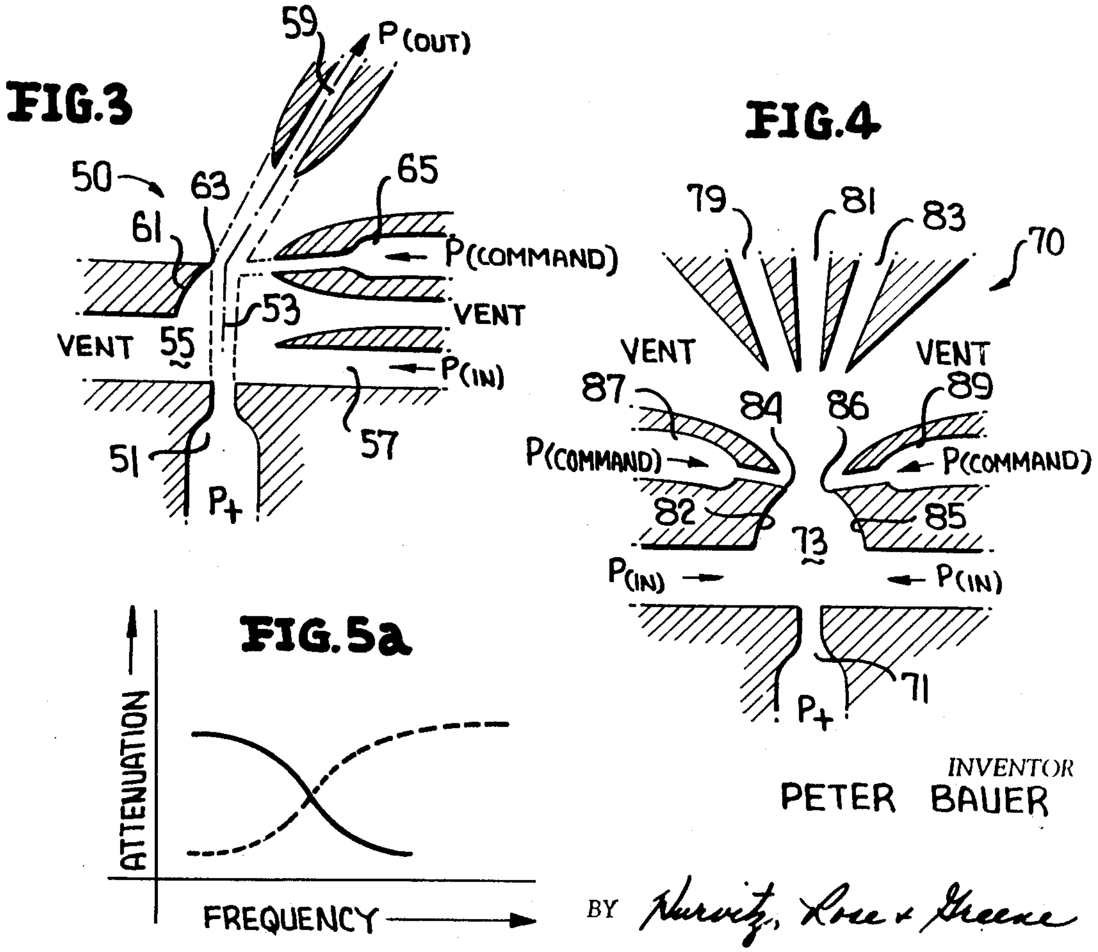
FIG. 3 is a diagrammatic illustration of the operation of a second embodiment of the present invention wherein a power stream is selectively bounced off a wedge-shaped wall to selectively vary the gain of a fluidic ampflifier.
FIG. 4 is a plan view of a fluidic amplifier employing the principles illustrated in FIG. 3.
FIG. 5*a* is a plot of the amplitude attenuation versus frequency characteristic of a filter employed in FIG. 5.

Referring now to FIG. 3 of the accompanying drawings there is diagrammatically illustrated a fluidic amplifier 50 of the proportional stream-interaction type and in which gain-changing techniques are employed in accordance with the principles of a further embodiment of the present invention. Amplifier 50 includes a power nozzle 51 responsive to application of pressurized fluid (P+) thereto for issuing a power stream of fluid 53 into an interaction region or chamber 55. A control nozzle 57 is provided and is responsive to application of an input pressure signal (P in) thereto to issue a control stream of fluid in interacting relationship with the power stream 53 at the upstream end of chamber 55 and on the right side of the power stream (as viewed in FIG. 3). Control nozzle 57 is relatively wide so as to provide a low impedance input port for a fluid input signal. The left and right sides of interaction chamber 55 are vented to eliminate boundary layer effects and thereby assure proportional operation of amplifier 50. At the downstream end of interaction chamber 55 there is provided a receiving aperture 59 disposed so as to have its ingress orifice on the right side (as viewed in FIG. 3) of power stream 53 when undeflected. As so positioned, receiving aperture 59 provides an output pressure of substantially zero when the power stream is not deflected because of the fact that receiving aperture 59 receives substantially more of the power stream 53 in this condition.

A wall 61 is provided on the left side of power stream 61 and extends a comparatively short distance downstream of chamber 55 relative to the length of chamber 55. Wall 61 converges toward power stream 53 to form a sharp point or edge 63 terminating the wall at a point immediately adjacent to, but out of contact with, the undeflected power stream 53. Wall 61 may either be slightly concave as illustrated in FIG. 3, or substantially straight, depending upon considerations to be discussed subsequently. A command nozzle 65 is disposed on the right side of power stream 53 (as viewed in FIG. 3) and somewhat upstream of control nozzle 57. Command nozzle 65 is oriented so that, upon application of pressurized fluid from a command signal thereto, a command stream of fluid is issued substantially toward the point or apex 63 of wall 61. The direction of the command stream may be varied somewhat so as to be directed to wall 61 at a point somewhat upstream of apex 63, the precise orientation depending upon considerations to be discussed subsequently.

The primary purpose of command nozzle 65 is to issue a command stream of fluid which causes power stream 53 to be deflected slightly toward the left (as viewed in FIG. 3) so that the power stream is bounced off converging wall 61 in the region of tip 63. The command stream may either be continuously variable over a range of pressures, or variable in discrete steps. Such bouncing of the power stream off wall 61 produces a substantial change in power stream direction such that the power stream is deflected toward the right (as viewed in FIG. 3). The angle of deflection of the power stream resulting from bouncing the stream off wall 61 is much greater than the deflection required to cause the power stream to impact against wall 61. Thus, only a slight deflection to the left produces a rather substantial deflection to the right. Input signals of increasing strength received at control nozzle 57 tend to move the point of impact of power stream 53 on wall 61 in a generally upstream direction, further increasing the angle of deflection of the power stream after impact with wall 61, so that more and more of the power stream is received by receiving aperture 59. It may be seen, therefore, that for different command stream strengths, a given input signal at control nozzle 57 produces different deflections of the power stream 53 toward receiving aperture 59. The gain of the amplifier 50 may, therefore, be selectively varied by simply varying the pressure of the command stream applied to command nozzle 65. The overall effect of the command signal in amplifier 50 may be considered as amplifying the deflection produced by the input signal at control nozzle 57.

It is to be noted that the portion of the power stream 53 which is not obstructed by wall 61 is also deflected along with that portion of the stream that is obstructed by wall 61. The reason for this is that the portion of the fluid which is actually obstructed is deflected away from wall 61 and acts to deflect the remainder of the stream correspondingly.

The concavity of wall 61, to a certain degree, determines the shape of the gain characteristic of the amplifier for any given command signal strength. For example, if wall 61 is perfectly straight, the angle at which the power stream is deflected off wall 61 is comparatively smaller than is the case where wall 61 is provided with a degree of concavity. In addition, a slight degree of concavity minimizes any tendency the power stream may have to disperse upon impact with the wall.

It is to be noted that a relatively low level signal can produce rather substantial power stream deflections due to the combined effects of command nozzle 65 and wall 61. These deflections are somewhat greater than those produced by simple momentum interaction between control and power streams. As a result, a relatively low level input signal can be provided at a relatively low input pressure and hence, a relatively wide low impedance nozzle 57 is provided for the input signal.

Referring now to FIG. 4 of the accompanying drawings there is illustrated an amplifier 70 which is a double-sided symmetrical version of amplifier 50 of FIG. 3. Amplifier 70 comprises a power nozzle 71 adapted to issue a power stream of fluid into an interaction region 73. A pair of opposed left and right control nozzles 75 and 77 respectively are disposed in substantial opposition at the upstream end of chamber 73. Left, center, and right output passages 79, 81, and 83 respectively are disposed at the downstream end of chamber 73 with central output passage 81 in substantial alignment with power nozzle 71 and left and right output passages 79 and 83 being symmetrically disposed with respect to central output passage 81. A left sidewall segment 82 is disposed immediately downstream of left control nozzle 75 and converges toward the undeflected power stream issued from power nozzle 71. Sidewall 82 terminates in an apex 84 which is disposed immediately adjacent to the undeflected power steam without providing an obstruction therefor. A similar sidewall segment 85 is disposed on the right side of the power stream, symmetrically disposed with respect to sidewall segment 82, and terminates in a sharp point or apex 86 which like apex 84 is disposed immediately adjacent to, but not in obstructing relationship with, the undeflected power stream issued from power nozzle 71. Left and right command nozzles 87 and 89 respectively have the upstream sides of their egress orifices terminated at apices 84 and 86 respectively, the nozzles 87 and 89 being oriented so as to issue command streams of fluid toward or slightly upstream of respective apices 86 and 84 on the opposite side of walls 85 and 82 respectively.

The operation of amplifier 70 in FIG. 4 is substantially similar to the operation of amplifier 50 in FIG. 3. When it is desired to produce a greater amplification at output passage 79 in response to an input signal provided at control nozzle 75, a command stream of appropriate pressure is applied at command nozzle 87. This produces a deflection of the power stream sufficient to bounce the power stream off wall 85 in the vicinity of apex 86. The power stream is redeflected by wall 85 toward output passage 79 to a degree dependent upon the strength of the command signal issuing from nozzle 87. Similarly, if it is desired to provide a greater gain at output passage 83 in response to an input signal applied to control nozzle 77, a command signal of appropriate pressure is applied to command nozzle 89 whereby to issue a command stream of fluid of sufficient magnitude to deflect the power stream toward wall 82. The power stream, when bounced off wall 82, is redeflected toward output passage 83 at an angle which is greater than the deflection produced by input signal applied at control nozzle 77.

Naturally, the input signals applied to control nozzles 75 and 77 may be differentially related if so desired, and the output signals applied across any pair of output passages 79, 81 and 83 may be utilized to provide a differentially varying output signal. Likewise, the command signals applied to command nozzles 87 and 89 may be independently initiated or may be differentially related.

As discussed above in relation to amplifier 50 of FIG. 3, the walls 82 and 85 may be straight or concave and moreover the degree of concavity in one of the walls may be different than that in the other.

Figure 5:
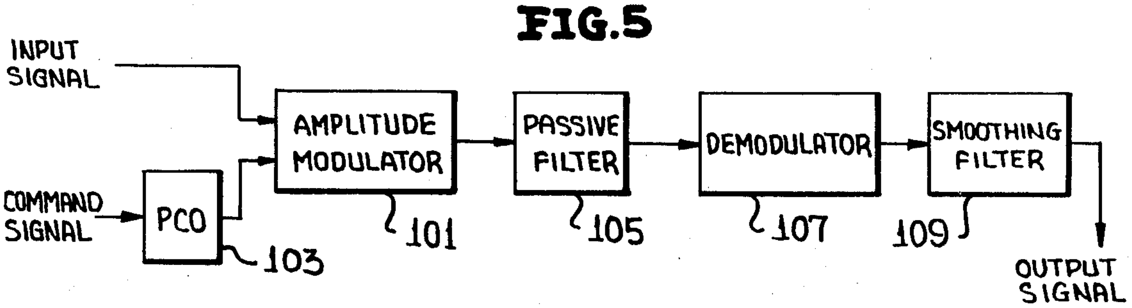
FIGS. 5, 6, 7 and 8 are schematic diagrams of fluidic circuits having selectively variable output signal amplitude versus input signal amplitude characteristics, each using frequency variation techniques to accomplish amplitude variations.

Referring now specifically to FIG. 5 of the accompanying drawings there is illustrated a circuit for providing a selectively variable output amplitude versus input amplitude characteristic for fluid signals. More specifically, a fluid input signal is applied to the modulation input port of a fluidic amplitude modulator 101. Amplitude modulator 101, by way of example, may be of the type illustrated and described in copending U.S. Pat. application Ser. No. 508,719, filed on Nov. 19, 1965 by E. N. Dexter and Arthur L. Humphrey, now U.S. Pat. No. 3,428,067, and assigned to the assignee as the present invention. The carrier frequency input port of amplitude modulator 101 is fed by a constant amplitude variable frequency signal provided by a pressure controlled oscillator (PCO) 103. PCO 103 provides a series of fluid pulses having a frequency which varies as a function of an input pressure signal. It is assumed herein that the PCO output frequency varies linearly with input pressure. PCO 103 provides an oscillatory fluid output signal having a constant amplitude and having a frequency which is variable in response to the variable pressure of a fluid command signal applied thereto.

The output signal provided by the fluidic amplitude modulator 101 is an oscillatory signal having a frequency equal to the frequency of the output signal from the PCO 103, and having an amplitude envelope which varies in accordance with the amplitude of the input signal. This amplitude-modulated signal is applied to a passive fluidic filter 105 which by way of example, may be of the type illustrated in U.S. Pat. No. 3,292,648. The important characteristic of filter 105 as regards the present invention is its attenuation versus frequency characteristic. Specifically, filter 105 has a characteristic wherein the attenuation of a signal applied thereto is variable in accordance with the frequency of said signal. This variable attenuation occurs in the range of frequencies provided by PCO 103 so that, depending upon the particular frequency chosen by the command signal, the amplitude-modulated input signal 105 is attenuated to a known degree. Two possible attenuation versus frequency characteristics for filter 105 are illustrated as curves C and D in FIG. 5*a*. These curves represent decreasing and increasing attenuation respectively versus frequency. More complex attenuation versus frequency characteristics may be employed as necessary to give the desired output versus input function for the circuit of FIG. 5.

The filtered amplitude-modulated signal provided at the output port of the filter 105 is then demodulated at demodulator 107 which, by way of example, may be of the type illustrated in U.S. Pat. No. 3,292,648. The demodulated output signal may then be smoothed in a smoothing filter 109 which by way of example may be a simple storage capacitor. The output signal provided by smoothing filter 109 is an analog fluid signal having an amplitude which is determined by the amplitude of the input signal and by the frequency of PCO 103.

Utilization of FIG. 5 may take many forms. For example, the input signal may be received from a fluidic amplifier circuit in which it is desired to vary the gain of the particular signal in response to command signal variations; or the input signal may be generated in a control system in which command signal variations are to be employed to vary the control function; etc.

Thus the circuit of FIG. 5 achieves a variable gain characteristic by converting a variable amplitude signal to an amplitude-modulated signal having a selectively variable frequency, and then altering the amplitude of the amplitude-modulated signal by a device having a variable attenuation versus frequency characteristic. Naturally, any device having a variable attenuation versus frequency characteristic is suitable for this purpose and utilization of the specific passive filter 105 referred to above need not be a limiting factor on the scope of the present invention.

Figure 6:
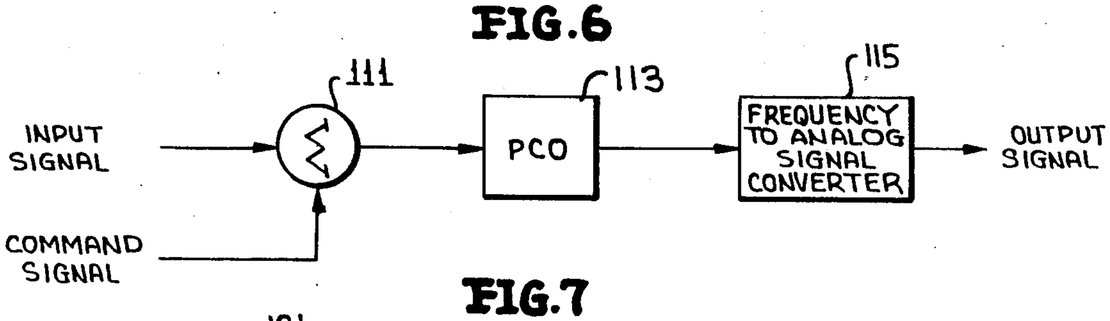

Another circuit utilizing operations in the frequency domain to provide selective amplitude variations in an analog input signal is schematically illustrated in FIG. 6 of the accompanying drawings. In the circuit of FIG. 6 the fluid input signal and the fluid command signal are both applied to a pressure summing device 111 which by way of example may be a simple Y-configured fluid passage in which the two input signals are applied to the legs of the Y and the output signal is derived from its stem. The summation of the pressures applied to summer 111 is applied as an input signal to a PCO 113. The output signal from PCO 113 is oscillatory with a constant amplitude and a frequency which depends upon the summation of the pressures at pressure summing device 111. As is the case with PCO 103 in FIG. 5, PCO 113 of itself may not provide a constant amplitude signal over its entire range of frequencies. Under such circumstances appropriate clipping and shaping circuits can be utilized to provide a constant amplitude output signal, such circuits being considered part of PCO 103 and PCO 113 for purposes of the present description. The oscillatory output signal from PCO 113 is applied to a frequency-to-analog converter 115 which by way of example may be a simple storage or integrating capacitor providing an analog fluid output signal having a pressure or amplitude which is directly proportional to the frequency of the signal provided by PCO 113.

In operation, with no command signal provided to summer 111, the output signal from frequency-to-analog converter 115 varies simply as a function of the amplitude of the input signal applied to the summer 111. Upon introduction of a command signal to summer 111 the frequency of PCO 113 is changed accordingly and hence the output signal provided by frequency-to-analog signal converter 115 is provided at correspondingly different amplitudes. In this way, the overall output signal versus input signal characteristic of the circuit of FIG. 6 may be varied in accordance with selective application of the command signal to summer element 111.

Figures 7, 8:
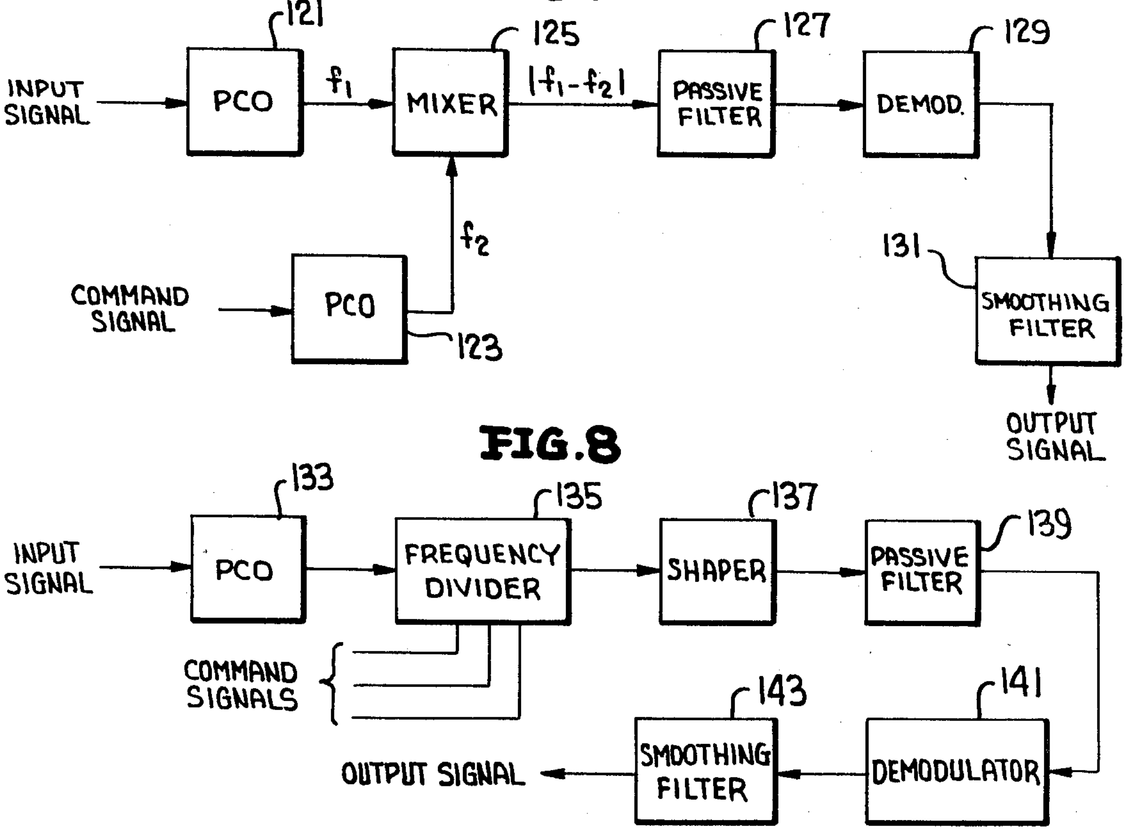

Still another embodiment of the present invention is illustrated in FIG. 7 wherein both the fluid input signal and the fluid command signal are converted to respective individual frequency signals. More particularly, the fluid input signal applied to a PCO 121, which provides an output signal having a constant amplitude and a frequency $f_1$ which varies in accordance with the pressure of the input signal. Similarly, the command signal is applied to a PCO 123 which provides a constant amplitude oscillatory output signal having a frequency $f_2$ which varies in accordance with the pressure of the command signal. The output signals from the two PCO's 121 and 123 are applied to a mixer 125 which provides an output signal of constant amplitude at a frequency equal to $f_1-f_2$. Mixer 125 by way of example may be a conventional fluidic amplifier in which the two input signals are applied to respective opposed control nozzles of the amplifier and the output signal is filtered so that only the difference frequency between the two input signals is passed. Other possible fluidic elements suitable for use as mixer 125 are passive combiners of the type comprising element 111 of FIG. 6, and passive fluidic AND gates of the type illustrated in U.S. Pat. No. 3,277,915. The difference or beat frequency signal provided by mixer 125 is applied to the passive filter 127, for example of the same type as filter 105 in FIG. 5 and which has a variable attenuation versus frequency characteristic in the frequency range over which the output signal from mixer 125 varies. The output signal provided by passive filter 127 is then demodulated at the modulator 129 and smoothed at smoothing filter 131 to provide an output signal for the circuit having an amplitude which varies in accordance with variations in both the input and command signals. Demodulator 129 is substantially similar to the demodulator 126 of FIG. 5 and smoothing filter 131 is substantially the same as filter 109 in FIG. 5.

In operation of circuit illustrated in FIG. 7, in the absence of a command signal, the output signal provided at the output of smoothing filter 131 is a simple function of the input signal applied to PCO 121. The input signal amplitude is converted to a frequency $f_1$ which in turn is applied to the mixer 125. Where an effectively zero level command signal is applied to PCO 123, the latter operates at some quiescent frequency $f_2$ and the mixer 125 provides a signal having a frequency equal to $f_1-f_2$. The passive filter 127 then attenuates this beat or difference frequency signal in accordance with the attenuation versus frequency characteristic of the filter, the amplitude of the output signal provided by filter 127 varying as a function of variations in amplitude of input signal applied to PCO 121. The signal is demodulated at demodulator 129 and smoothed at filter 131 to provide an overall output signal which varies with the input signal as a function determined solely by the passive filter 127 and its attenuation versus frequency characteristic.

If now a command signal is applied to PCO 123 the frequency $f_2$ will vary accordingly and the operational point on the attenuation versus frequency characteristic of filter 127 will be changed. The command signal thereby is capable of selectively varying the overall gain characteristics of the circuit of FIG. 7 by selectively choosing the operating point on the characteristic of filter 127.

Referring now to FIG. 8 of the accompanying drawings there is illustrated a circuit employing digital techniques to vary the circuit output signal versus input signal response. An analog input signal is applied to PCO 133 which provides an output pulse train at a frequency dependent upon the pressure of the input signal applied thereto. The pulses from PCO 133 are fed to frequency divider 135 which by way of example may be of the type illustrated in U.S. Pat. No. 3,001,698. Frequency divider 135 comprises a number of stages depending upon the frequency division ratio to be provided by frequency divider 135. Thus, if a one stage divider is provided, the output pulses provided by frequency divider 135 will be at half the frequency of the input pulses supplied from PCO 133; if two divider stages are provided, the frequency divider output frequency will be one-quarter of its input frequency; if three divider stages are provided, the output frequency of divider 135 will be one-eighth of its input frequency; etc. Frequency divider 135 also includes circuitry by which the individual stages of the divider may be selectively set or reset for example in the manner illustrated in U.S. Pat. No. 3,229,705. Such selective reset and set capability enables the division ratio of the divider 135 to be selectively varied so that the output frequency of the frequency divider may be selectively changed by appropriate command signals.

The output pulses from frequency divider 135 are fed to a shaper where they are converted to a constant amplitude oscillatory sine wave having a frequency equal to the frequency of the pulses provided by the frequency divider. The output signal from shaper 137 is then applied to a passive filter 139 which is substantially identical to passive filters 127 of FIG. 7 and 105 of FIG. 5. Passive filter 139 has a variable attenuation versus frequency characteristic in the range of output frequencies provided by frequency divider 135. The output signal from filter 139 is then fed to a demodulator 141 and in turn to a smoothing filter 143 to provide an output signal which has an amplitude that varies in accordance with both the input signal level and the selective application of command signals to frequency divider 135. The demodulator 141 and smoothing filter 143 are substantially the same as demodulator 107 and filter 109 of FIG. 5.

In operation, the input signal is applied to PCO 133 producing a pulse train of related frequency which is applied to frequency divider 135. In the absence of command signals applied to frequency divider 135, the frequency divider provides a pulse train of somewhat lesser frequency which is related to the output frequency of PCO 133 by a power of two. The resultant frequency of the divider output signal is shaped in shaper 137, and filtered in filter 139 so as to be attenuated in accordance with the attenuation versus frequency characteristic of filter 139. Thus the filter attenuation versus frequency characteristic determines the function by which the output signal from smoothing filter 143 varies in response to variations of the input signal applied to PCO 133.

If now the frequency division ratio at frequency divider 135 is varied by application of appropriate command signals thereto, the frequency applied to a passive filter 139 is changed accordingly and the attenuation provided by filter 139 changes correspondingly. The output signal from smoothing filter 143 is now a complex function of both the passive filter gain characteristic and the selective application of command signals to frequency divider 135.

In the various embodiments illustrated in FIGS. 5, 6, 7 and 8 of the above, it is understood that fluidic amplifiers or attenuation elements such as restrictors may by utilized accordingly to adjust the various signals to appropriate levels. For example, the output signal from mixer 125 in FIG. 7 may be of sufficiently low level to require amplification, in which case a proportional fluidic amplifier may be employed to amplify the signal level sufficiently to be discerned after attenuation by filter 127. Such techniques are straight-forward and well recognized in the fluidic art.

While I have described and illustrated one specific embodiment of my invention, it will be clear that variation of the details of construction which are specifically illustrated and described may be resorted to without departing from the spirit and scope of the invention as defined in the appended claims.

1. A proportional fluidic amplifier having a selectively variable gain characteristic comprising:

power nozzle means responsive to application of pressurized fluid thereto for issuing a power stream of fluid, said power stream having a specified pressure gradient transversely of the longitudinal axis of said power stream at a predetermined distance downstream of said power nozzle means;

control means responsive to application of a fluid input signal thereto for selectively deflecting said power stream as a function of said input signal;

receiver means disposed at said predetermined distance downstream of said power nozzle means for receiving varying proportions of said power stream as a function of power stream deflection and said power stream pressure gradient;

gain command means for selectively varying the pressure gradient of said power stream at said predetermined distance downstream of said power nozzle means, said gain command means comprising means for selectively flowing a first command stream of fluid immediately adjacent and in a direction substantially opposite to said power stream such that adjacent boundaries of said power stream and first command stream interact sufficiently to modify said pressure gradient.

2. The fluidic amplifier according to claim 1 wherein said gain command means further includes means for selectively varying the flow rate of said first command stream over a predetermined range of flow rates.

3. The fluidic amplifier according to claim 1 wherein:

said fluidic amplifier further comprises additional control nozzle means responsive to application of a further fluid input signal thereto for issuing a further control stream as a function of said further fluid input signal, the power stream deflection produced by said first mentioned and said further control streams being in opposite senses; and said gain control means further comprises means for flowing a second command stream of fluid immediately adjacent the side of said power stream in opposite said first command stream and in a direction substantially opposite that of said power stream.

4. A proportional fluidic amplifier for providing a fluid output signal as a selectively variable function of a fluid input signal in response to selective application of a fluid command signal, said amplifier comprising:

power nozzle means responsive to application of pressurized fluid thereto for issuing a power stream of fluid, said power stream having a specified pressure gradient transversely of the longitudinal axis of said power stream at a predetermined distance downstream of said power nozzle means;

control means responsive to said fluid input signal for selectively deflecting said power stream as a function of said input signal;

receiver means disposed at said predetermined distance downstream of said power nozzle means for receiving varying proportions of said power stream as a function of power stream deflection and of said power stream pressure gradient;

gain command means for selectively varying the pressure gradient of said power stream at said predetermined distance downstream of said power nozzle means, said gain command means including means for selectively issuing a command stream of fluid which interacts with said power stream upstream of said receiver means and downstream of said control means, said gain command means further including a wall having a section which converges toward said power stream in a downstream direction and disposed on the opposite side of said power stream from said control means, the downstream end of said wall terminating in a sharp apex pointing generally transversely of the power stream direction and disposed adjacent said power stream undeflected; means for selectively and primarily deflecting said power stream against said wall in the general vicinity of said apex such that said power stream is secondarily reflected by said wall at an angle which varies as a function of the primary deflection of said power stream by said last-mentioned means.

5. The fluidic amplifier according to claim 4 wherein the angle at which the power stream is secondarily reflected by said wall is substantially greater than the angle of the primary deflection of said power stream.

6. The fluidic amplifier according to claim 5 wherein said means for selectively and primarily deflecting said power stream comprises means for issuing a command stream of fluid in interacting relationship with said power stream from the side of said power stream opposite said wall, said command stream being directed slightly toward the upstream side of the apex of said wall.

7. A proportional fluidic amplifier having a selectively variable gain characteristic, said amplifier comprising:

means for issuing a power stream of fluid;

control means responsive to application of a fluid input signal thereto for deflecting said power stream to one side as a function of said input signal;

receiver means disposed downstream of said control means and on a second side of said power stream when said power stream is undeflected for receiving increasing portions of said power stream as a function of increasing deflection of said power stream toward said second side thereof;

a wall disposed on said one side of said power stream, said wall converging toward said power stream and terminating in a sharp edge adjacent said power stream when said power stream is undeflected, said wall being configured such that for a deflection of said power stream toward said one side and against said sharp edge said wall provides a greater deflection of said power stream toward said second side; and command means for selectively deflecting said power stream against said sharp edge.

8. The fluidic amplifier according to claim 7 wherein said command means comprises means for selectively issuing a command stream of fluid to deflect said power stream against said sharp edge.

9. The fluidic amplifier according to claim 8 wherein said command stream of fluid is variable over a continuous range of pressures to selectively change the range of power stream deflection produced by said wall toward said second side.

10. The fluidic amplifier according to claim 8 wherein said command stream is issued from said second side of said power stream and is directed generally toward said sharp edge of said wall.

11. The fluidic amplifier according to claim 10 wherein the upstream end of said amplifier on said one side of the power stream is open to ambient pressure.

12. A fluidic circuit for providing a fluid output signal as a function of a variable amplitude fluid input signal, wherein said function is selectively variable in response to a fluid command signal of selectively variable amplitude, said circuit comprising:

variable frequency oscillator means responsive to said command signal for providing an oscillatory fluid signal having a frequency which varies over a predetermined frequency range as a function of the command signal amplitude;

modulation means responsive to said oscillatory fluid signal and said input signal for providing an amplitude-modulated fluid signal which comprises said oscillatory fluid signal amplitude modulated by said input signal;

filter means having an impedance which varies in a predetermined manner with the frequency of input signals to said filter means over said predetermined frequency range and responsive to said amplitude-modulated fluid signal for providing a filtered amplitude-modulated fluid signal having a peak amplitude which varies with the amplitude of said fluid input signal an with the frequency of said oscillatory fluid signal; and detector means for demodulating said filtered amplitude-modulated oscillatory signal to provide a fluid output signal having an amplitude which varies with the amplitude of said fluid input signal and with the frequency of said oscillatory fluid signal.

13. The circuit according to claim 12 further comprising means for smoothing said fluid output signal whereby to provide an analog fluid output signal devoid of frequency components of said variable frequency oscillator means.

14. The circuit according to claim 12 wherein the oscillatory fluid signal from said variable frequency oscillator means is of constant amplitude for all signal frequencies.

15. A fluidic circuit providing a fluid output signal as a function of a varying amplitude fluid input signal wherein said function is selectively variable in response to a fluid command signal of selectively variable amplitude, said circuit comprising:

means for converting said fluid input signal to a first oscillatory fluid signal having a frequency which varies as a function of the amplitude of said fluid input signal;

means for converting said fluid command signal to a second oscillatory fluid signal having a frequency which varies as a function of the amplitude of said fluid command signal;

means for providing a third oscillatory fluid signal having a frequency equal to the difference in frequency between said first and second oscillatory fluid signals;

fluid flow impedance means having an impedance which varies with frequency over the range of operating frequencies of said third oscillatory fluid signal;

means for applying said third oscillatory fluid signal to said fluid flow impedance means whereby said fluid flow impedance means provides a fourth oscillatory fluid signal having an amplitude which varies with the frequency of said third oscillatory fluid signal in a manner corresponding to the variation of impedance of said fluid flow means with the frequency of said third oscillatory fluid signal;

detector means for converting said fourth oscillatory fluid signal to a fluid signal having an amplitude which corresponds to the amplitude envelope of said fourth oscillatory fluid signal.

16. A fluidic circuit for providing a fluid output signal as a function of a variable fluid input signal, wherein said function is selectively variable in response to a variable amplitude fluid command signal, said circuit comprising:

means for converting said fluid input signal to a first train of fluid pulses having a first frequency which varies as a function of the amplitude of said fluid input signals;

frequency divider means for providing a second train of fluid pulses at a frequency which varies as a specified function of the frequency of said first train of fluid pulses;

means for selectively varying said specified function;

means for converting said second train of fluid pulses to an analog of fluid signal having an amplitude which varies with said second frequency of said second fluid pulse train.

17. The combination according to claim 16 wherein said frequency divider means comprises a binary counter for normally dividing the frequency of said first train of pulses by a power of two to provide said second train of pulses, and wherein said means for selectively varying said specified function includes means for selectively varying the frequency division ratio of said binary counter.

18. The combination according to claim 16 wherein the frequency of said second train of pulses varies over a specified frequency range, and wherein said means for converting includes a fluid signal filter having an impedance which varies in a predetermined manner over said specified range of frequencies and which is arranged to receive said second train of fluid pulses and provide an output signal having an amplitude which varies with the frequency of said second train of fluid pulses in a manner corresponding to that in which the filter impedance varies with the frequency of said second train of fluid pulses.

19. A fluidic circuit for providing a fluid output signal as a function of a variable amplitude fluid with input signal wherein said function is selectively variable in response to a fluid command signal of selectively variable amplitude, said circuit comprising:

summing means responsive to the amplitude of said fluid input signal and the amplitude of said fluid command signal for providing a fluid control signal having an amplitude equal to the sum of the amplitudes of said input signal and said command signal;

means for converting said control signal to an oscillatory fluid signal having a frequency which varies as a function of the amplitude of said control signal;

converter means for converting said oscillatory fluid signal to an analog output signal having an amplitude which varies in accordance with the frequency of said oscillatory fluid signal.

20. The combination according to claim 19 wherein said oscillatory fluid signal has a frequency which varies over a specified frequency range, and wherein said converter means includes a fluid signal filter having an impedance which varies in a predetermined manner over said specified frequency range and which is arranged to receive said oscillatory fluid signal and provide an output signal having an amplitude which varies with the frequency of said oscillatory fluid signal in a manner corresponding to that in which said filter impedance varies with the frequency of said oscillatory fluid signal.

21. The method of varying the gain of an analog fluidic amplifier of the type wherein a power stream of fluid is selectively deflected in an interaction region and received at the downstream end of said interaction region as a function of its deflection, said method comprising the steps of issuing a further fluid stream into said interaction region in a direction opposite that of said power stream and side-by-side with a significant portion of the length of said power stream such that the adjacent boundaries of said power stream and further stream interact sufficiently to vary the transverse pressure gradient of said power stream; and venting said interaction region sufficiently to prevent a pressure buildup therein by fluid from said further stream.

22. An analog fluidic amplifier having a variable gain characteristic, said amplifier comprising:

an interaction region;

means for issuing a power stream of fluid into said interaction region;

means for selectively deflecting said power stream;

receiver means disposed for receiving varying proportions of said power stream as a function of power stream deflection;

a wall having two convergent sections which terminate in a sharp apex pointing generally transversely of the power stream flow direction and disposed adjacent said power stream when the latter is undeflected;

further means for selectively and primarily deflecting said power stream against said apex such that said power stream is secondarily reflected by said apex at an angle which varies as a function of the primary deflection of said power stream by said further means.

23. The fluidic amplifier according to claim 22 wherein the angle at which the power stream is secondarily reflected by said apex is substantially greater than the angle of the primary deflection of said power stream.

24. The fluidic amplifier according to claim 23 wherein said further means comprises means for issuing a command stream of fluid from the side of said power stream opposite said wall and in interacting relationship with said power stream, said command stream being directed slightly toward the upstream side of the apex of said wall.

25. A fluidic circuit for providing a fluid output signal as a function of a fluid input signal having a first variable parameter, said function being selectively variable with a second variable parameter of a fluid command signal, said circuit comprising:

first means for receiving said fluid input signal and providing a first fluid signal having a frequency in a specified range of frequencies which is a predetermined function of said first variable parameter;

second means for receiving said command signal and varying the frequency of said first fluid signal over said specified range of frequencies as a function of said second variable parameter;

fluid signal filter means, having a fluid flow impedance which varies in a predetermined manner with frequencies in said specified range of frequencies of input signals applied thereto, for receiving said first fluid signal as varied by said second means and providing said fluid output signal.

26. The combination according to claim 25 further comprising detector means for receiving said output signal and providing a further signal having an amplitude which varies with said first and second variable parameters.

27. The combination according to claim 25 wherein said first variable parameter is the amplitude of said fluid input signal and said second variable parameter is the amplitude of said fluid command signal.

28. The combination according to claim 25 wherein said first means comprises a variable frequency oscillator which provides said first fluid signal at a frequency which varies in said specified range of frequencies as said predetermined function of said first variable parameter of said fluid input signal; and wherein said second means comprises frequency divider means which receives said first fluid signal and is responsive to said second variable parameter of said fluid command signal for varying the division factor by which it divides the frequency of said first fluid signal.

29. The combination according to claim 25 wherein said first means comprises a first variable frequency oscillator responsive to said first variable parameter of said fluid input signal for providing said first fluid signal, and wherein said second means comprises: a second variable frequency oscillator for providing a second fluid signal having a frequency which varies over a second range of frequencies as a function of said second variable parameter of said fluid command signal; and mixer means for receiving said first and second fluid signals and applying a third fluid signal to said fluid signal filter means, said third fluid signal having a frequency which lies in said specified range and is the difference between the frequencies of said first and second fluid signals.

30. The combination according to claim 25 wherein said first means comprises a variable frequency oscillator which provides said first fluid signal as a function of the sum of the amplitudes of fluid signals applied thereto, and wherein said second means includes means for summing the amplitudes of said fluid input signal and said fluid command signal and applying a fluid signal having an amplitude with the resulting sum to said variable frequency oscillator.